US008631126B2

(12) United States Patent    (10) Patent No.:     US 8,631,126 B2
Veiseh et al.               (45) Date of Patent:     Jan. 14, 2014

(54) SYSTEM AND MARKUP LANGUAGE FOR INFORMATION EXTRACTION FROM STAND-ALONE DEVICES IN WEBSPACE

(75) Inventors: Nima Veiseh, New York, NY (US);
    David W. Baarman, Fennville, MI (US);
    Thomas Jay Leppien, Grand Haven, MI (US)

(73) Assignee: Access Business Group International LLC, Ada, MI (US)

( * ) Notice: Subject to any disclaimer, the term of this patent is extended or adjusted under 35 U.S.C. 154(b) by 58 days.

(21) Appl. No.: 13/303,389

(22) Filed: Nov. 23, 2011

(65) Prior Publication Data

US 2012/0072535 A1    Mar. 22, 2012

Related U.S. Application Data

(63) Continuation of application No. 12/074,500, filed on Mar. 4, 2008, now abandoned.

(51) Int. Cl.
    *G06F 15/173*    (2006.01)
(52) U.S. Cl.
    USPC .......................................... 709/224; 709/200
(58) Field of Classification Search
    USPC ........ 700/108–111, 115–117; 701/29.6–29.7;
                 709/200, 217–219, 223, 224, 245
    See application file for complete search history.

(56) References Cited

U.S. PATENT DOCUMENTS

| | | | |
|---|---|---|---|
| 5,448,230 A | 9/1995 | Schanker et al. | |
| 5,650,936 A | 7/1997 | Loucks et al. | |
| 5,673,252 A | 9/1997 | Johnson et al. | |
| 5,748,104 A | 5/1998 | Argyroudis et al. | |
| 5,862,803 A | 1/1999 | Besson et al. | |
| 5,883,576 A | 3/1999 | De LaHuerga | |
| 5,897,607 A | 4/1999 | Jenney et al. | |
| 5,983,233 A | 11/1999 | Potonniee | |
| 6,014,089 A | 1/2000 | Tracy et al. | |

(Continued)

FOREIGN PATENT DOCUMENTS

| | | | |
|---|---|---|---|
| EP | 0631266 B1 | 7/1999 | |
| EP | 1187015 A2 | 3/2002 | |

(Continued)

OTHER PUBLICATIONS

Salim Hadim and Nader Mohamed. Middleware: Middleware Challanges and Approaches for Wireless Sensor Networks. Mar. 2006. IEEE Distributed Systems Online 1541-4922. vol. 7, No. 3.

(Continued)

*Primary Examiner* — Brendan Higa
(74) *Attorney, Agent, or Firm* — Warner Norcross & Judd LLP (57) ABSTRACT

A system and markup language for information extraction from stand-alone devices in webspace is disclosed. Devices are provided with Internet accessibility, thus becoming web objects, able to send and receive data through the Internet. A web object is assigned a static and dynamic serial number by its manufacturer which contains data pertaining to the web object/device. Also, the web object has the capability to report on its status, making such information available over the Internet. Thus, the device's owner can monitor the device by accessing it through the Internet and a web page, and the manufacturer or other authorized user can also securely access the device/web object to monitor its status. The web object can thus report that maintenance is required, a service part should be ordered, and maintains this information within the dynamic portion of its serial number, which updates based on changes to its status.

30 Claims, 2 Drawing Sheets

(56) References Cited

U.S. PATENT DOCUMENTS

| | | |
|---|---|---|
| 6,121,593 A | 9/2000 | Mansbery et al. |
| 6,148,342 A | 11/2000 | Ho |
| 6,346,886 B1 | 2/2002 | De LaHuerga |
| 6,577,407 B1 | 6/2003 | Kopecki |
| 6,735,586 B2 | 5/2004 | Timmons |
| 6,735,771 B1 | 5/2004 | Houlding |
| 6,742,001 B2 | 5/2004 | Ripley |
| 6,742,165 B2 | 5/2004 | Lev et al. |
| 6,751,562 B1 | 6/2004 | Blackett et al. |
| 6,757,714 B1 | 6/2004 | Hansen |
| 6,942,616 B2 | 9/2005 | Kerr, II |
| 6,990,659 B1 | 1/2006 | Imai |
| 7,032,186 B1 | 4/2006 | Gasser et al. |
| 7,165,722 B2 | 1/2007 | Shafer et al. |
| 7,295,919 B2 | 11/2007 | Humphrey |
| 7,325,054 B2 | 1/2008 | Ishimoto |
| 7,353,063 B2 | 4/2008 | Simms, Jr. |
| 7,355,730 B2 | 4/2008 | Landau et al. |
| 7,397,468 B2 | 7/2008 | Braun et al. |
| 2001/0013826 A1 | 8/2001 | Ahmed et al. |
| 2002/0091784 A1 | 7/2002 | Baker et al. |
| 2002/0161536 A1 | 10/2002 | Suh et al. |
| 2002/0177942 A1 | 11/2002 | Knaian et al. |
| 2003/0216880 A1 | 11/2003 | Endoh |
| 2003/0217067 A1 | 11/2003 | Gilstrap et al. |
| 2003/0229691 A1 | 12/2003 | Ishimoto |
| 2005/0154494 A1 | 7/2005 | Ahmed |
| 2006/0190728 A1 | 8/2006 | Veiseh et al. |
| 2006/0206373 A1 | 9/2006 | Blair et al. |
| 2006/0277279 A1 | 12/2006 | Hase |
| 2006/0282662 A1 | 12/2006 | Whitcomb |
| 2007/0053513 A1 | 3/2007 | Hoffberg |
| 2007/0058634 A1 | 3/2007 | Gupta et al. |
| 2007/0060147 A1 | 3/2007 | Shin et al. |
| 2007/0186106 A1 | 8/2007 | Ting et al. |
| 2007/0239862 A1 | 10/2007 | Bronez et al. |
| 2007/0245347 A1 | 10/2007 | Oya et al. |
| 2008/0004904 A1 | 1/2008 | Tran |

FOREIGN PATENT DOCUMENTS

| | | |
|---|---|---|
| JP | 11-282656 | 10/1999 |
| JP | 2001-344192 | 12/2001 |
| JP | 2006-201897 | 12/2001 |
| JP | 2003-271472 | 9/2003 |
| JP | 2003-337777 | 11/2003 |
| JP | 2005-078409 | 3/2005 |
| JP | 2005-275845 | 10/2005 |
| JP | 2005-284462 | 10/2005 |
| JP | 2006-135890 | 5/2006 |
| JP | 2007-025948 | 2/2007 |
| JP | 2007-102255 | 4/2007 |
| RU | 52 228 | 3/2006 |
| RU | 2 281 614 | 8/2006 |
| RU | 67 592 | 10/2007 |
| WO | 01/35373 | 5/2001 |
| WO | 02/071168 | 9/2002 |
| WO | 2004/024232 A1 | 3/2004 |
| WO | 2004/033898 | 4/2004 |
| WO | 2005/015824 | 2/2005 |
| WO | 2006/117198 | 11/2006 |
| WO | 2008/002525 | 1/2008 |

OTHER PUBLICATIONS

Harish Ramamurthy, B.S. Prabhu, Rajit Gadh. Wireless Industrial Monitoring and Control using a Smart Sensor Platform. IEEE Sensors Journal. 2007.

HTML 5: W3C Working Draft Jan. 22, 2008. http://www.w3.org/TR/2008/WD0html5-20080122/.

Thomas Hoffman. Smart Dust: Mighty motes for medicine, manufacturing, the military and more. Mar. 24, 2003. Computerworld. http://www.computerworld.com.

Jim Thomas. Little Brother's watching you. The future of surveillance is small, very small. 2003. Via3Net. http://www.via3.net/pooled/articles/.

March of the motes. Aug. 23, 2003. New Scientist. Volume 179. Issue 2409. Page 26.

SYSTEM AND MARKUP LANGUAGE FOR INFORMATION EXTRACTION FROM STAND-ALONE DEVICES IN WEBSPACE

CROSS-REFERENCE TO RELATED APPLICATIONS/INCORPORATION BY REFERENCE

This application is a continuation of U.S. application Ser. No. 12/074,500, filed Mar. 4, 2008, the content of which is incorporated herein by reference in its entirety.

BACKGROUND OF THE INVENTION

The Internet is used for a variety of functions, including transmission of data, text, pictures, and music. Most Internet access is currently obtained through wired means, such as a DSL line or a cable modem. Increasingly though, Internet access is available wirelessly, either within a structure such a home or outside a structure such as in a public park. As wireless Internet begins to become the dominant form of Internet access worldwide, new opportunities to connect previously unconnected devices to the Internet become possible.

Currently, most devices, aside from computers, personal data assistants, and wireless phones do not have the capability to receive or send data through the Internet. To the Internet, these devices are unreachable and therefore do not exist. However, by providing a wireless Internet connection component to these devices, they may then be connected to the Internet and be manipulated remotely. The dominant Internet language is currently HTML (Hyper Text Markup Language). A markup language is a combination of text and extra information pertaining to the text. There are many different languages, however, but none treat devices as web objects able to be viewed as a webpage. Web objects are hereinafter defined as an object which can transmit its specific data via the Internet to a remote user who can view and manipulate the data via a web browser.

Viewing a device as a web object is desirable because it creates a number of opportunities to interact with a device. Besides simply viewing a device's static information—such as its serial number, model number, and location—a user can also interact dynamically with a device. By equipping a device with a mini-server (a computer that accepts HTTP requests from web browsers and provides data flow) a user can retrieve data from the mini-server pertaining to the device but also monitor the device and command the device to do certain tasks remotely.

Another desirable aspect of viewing a device as a web object is the ability to gather data for research purposes. Manufacturers of products/devices are always very curious as to how they are being used, and obtaining this information through traditional means is difficult, expensive, time consuming, and generally not very accurate. However, if a manufacturer could access performance data from every device it sells, every day each device is operable, the data gained would be invaluable toward continuous improvement processes. Viewing all devices made by a manufacturer as a web object would enable a manufacturer to achieve that goal.

What is needed then is a system and markup language for information extraction from stand-alone devices in the Internet. The present invention uses an object-oriented markup language, similar to HTML to apply the concepts of language intent to correctly convey the meaning of a content-based webpage. This new scripting method and language makes an electronic device a web object in webspace (the Internet). The method of the present invention provides for a user to interact with many devices in webspace. Further, the present invention also includes miniature servers (mini-servers) that are attached to or integral to the devices or objects. These mini-servers connect wirelessly and securely to the Internet and communicate using the markup language of the present invention to present to designated users a webpage display of the devices in a web browser. The web browser extracts information from the mini-server equipped devices for analysis and processing in an easy and efficient manner over the Internet. The present invention also provides for different human languages (such as English, French, Japanese, etc.) to be displayed on the webpages, depending on the user's preferences and location.

It will be readily understood that the components of the present invention, as generally described and illustrated in the figures herein, may be arranged and designed in a wide variety of different configurations. Thus, the following more detailed description of the embodiments of the apparatus, system, and method of the present invention, as represented in figures, is not intended to limit the scope of the invention, as claimed, but is merely representative of selected embodiments of the invention.

Reference throughout this specification to "one embodiment" or "an embodiment" (or similar) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples, etc., to provide a through understanding of embodiments of the invention. One skilled in the art will recognize, however, that the invention can be practiced without one or more of the specific details, or with other methods, components, materials, etc. In other instances, well-known structures, materials, or operations are not shown or described in detail to avoid obscuring aspects of the invention.

SUMMARY OF THE INVENTION

The present invention provides for a markup language and system to be used with devices or objects that treats them as web objects able to be viewed over the Internet and displayed as webpages. Each device or object is equipped with a mini-server that has a unique IP address. Using wireless communication, the mini-server connects to the Internet. A remote user then enters the IP address of the mini-server, connecting to the device. Using the markup language, data is processed by the mini-server and communicated via the Internet and displayed as a web page for the user to interpret. The user can then send data or commands back to the device or the user can monitor the device as desired.

In one embodiment of the present invention, a device, for example a water treatment system (WTS), is equipped with a mini-server that is wirelessly connected to the Internet and also monitors performance data of the device, such as the amount of filter life remaining. As soon as the device is electrified, the mini-server looks for a wireless Internet connection. Upon finding a connection, the mini-server accesses the Internet and contacts preprogrammed sites; for example, the manufacturer's website. The device then relays current status information to the manufacturer over the Internet. After this initial contact, the device is accessible to those who know its IP address and those who become aware of it, such as the owner/operator. The owner may be provided with the device's IP address in the device's product literature, and may, at his/her discretion, decide to access the device's webpage. The markup language of the present invention provides an understandable format to display data in a webpage from the device for the user or other approved party to manipulate. In the case of the current example, as the mini-server of the WTS device detects the filter capacity declining below a preset level, the device mini-server sends a signal through the Internet to a designated party who ships a replacement to the device's location, without the owner's intervention.

In another embodiment of the present invention, the mini-server is configured to monitor device activity and report said activity to designated parties through the Internet. Using an air conditioner (A/C) as an example device, it is equipped with a mini-server that wirelessly connects to the Internet and also monitors and controls the air conditioner. When the air conditioner is connected to electrical power, the mini-server seeks an Internet connection and establishes an initial data connection. The mini-server reports to designated parties the location of the air conditioner on the Internet and other setup information as applicable. After the first data connection, the A/C is also accessible to the owner/operator, who is provided with the A/C's unique IP address. The owner is then able to access the A/C using the markup language of the present invention to provide an interactive webpage. It supplies the owner with information such as whether or not the device is currently operating, interior temperature and humidity level, power consumption, and other applicable data. Additionally, other designated parties are able to access the device as well, and extract other information as desired. Other parties could include the device manufacturer, the local electrical power company, or market research companies. In another application of the present invention, upon the owner's approval the electrical power provider in the area could access the owner's devices through the webpage and selectively deactivate or adjust other devices in order to conserve energy during peak demand or other situations.

In another embodiment of the present invention, the system and markup language is used to monitor the medical condition of patients. Patients are given mini-servers that have wireless Internet connectivity and an internal power supply to keep on their person. These mini-servers are able to monitor patients' condition, such as pulse, blood pressure, and other pertinent data. When the mini-servers are assigned to patients, some data is implanted in the devices, such as names, insurance carrier, and other unique data. As they first monitor their respective patients, they send data through the Internet, using their own internal mini-servers. The data is accessed by designated parties, such as the hospital where the patients are residing. Doctors, nurses, and other staff can simply access the webpage each mini-server creates which provides real-time medical data regarding each patient, and can also present data recorded over time, such as pulse rate and other data which is valuable for treatment. The markup language processes the data obtained by the mini-server and arranges in a format that is coherently assembled in a webpage, treating each patient as a web-viewable entity. Additionally, patients are able to travel outside the hospital, since the devices have wireless Internet connectivity, to other locations, such as their residences. This freedom of movement allows a doctor to monitor his patients in real-time without any inconvenience. If a patient's health suddenly worsens, for example, the doctor is immediately alerted through the Internet, and emergency services can be summoned to the patient's location, saving critical time in treating the patient.

In another embodiment of the present invention, the system and markup language is used to monitor a home entertainment system (HES). The HES is equipped with a mini-server that wirelessly and securely communicates through the Internet. The mini-server has a unique IP address which is accessible to authorized users who can view the HES as a webpage through the markup language of the present invention. For example, a parent is able to monitor the entertainment chosen by his or her child through the usage of the HES over the Internet from any location. Certain channels can be locked out, or the HES can be time-limited to control TV viewing on a periodic basis. The mini-server also records the activities of the HES for communication to the webpage, such as shows or videos watched. The mini-server can also control the HES, such as deactivating the HES at a certain time every day, and other pertinent data about HES performance is also monitored and displayed.

In another embodiment of the present invention, the system and markup language is used to monitor vehicles. Each vehicle is equipped with a mini-server with wireless Internet connectivity and encryption capability. Using the IP (Internet Protocol) address unique to each mini-server (and vehicle), each vehicle is displayed on its own webpage. The markup language of the present invention is used to communicate data and display it on a webpage in a useable format. When each vehicle is equipped with a mini-server, either at assembly or at a later date, the mini-server is assigned to the vehicle, given certain data regarding the vehicle, such as make, model, year, vehicle ID number, and other relevant data. The mini-server then connects to the Internet to communicate with designated computers. After this initial setup, the mini-server then monitors the vehicle and any user with the vehicle's IP address can view the vehicle's webpage. For example, a fleet of vehicles equipped with mini-servers can be constantly monitored by the fleet owner. Location, current speed, mileage, vehicle condition, and check engine light are some of the conditions that are monitored and reported in real-time. Using the present invention, a fleet owner can constantly supervise each vehicle in its fleet, and whether each vehicle is being properly operated. Additionally, the mini-server is able to interact with vehicle systems, such as applying a speed governor or shutting the engine off if necessary.

In another embodiment of the present invention, the mini-server provides varied levels of information in the markup language about the device to different users. For example, in the case of a water treatment system, the owner's webpage displays only basic information, such as the make and model of the device, filter status, consumption data, etc. The manufacturer's webpage displays all the information that the mini-server possesses, which includes total use time, software version, frequency of use, water pressure at filter, etc. The manufacturer is free to use this information to design improved future products, to send replacement parts as needed, or to send a service technician for maintenance and repair.

In another embodiment of the present invention, the mini-server is configured to allow access for market research. The manufacturer may desire to learn more about the usage of its products in the field, and can employ a research firm to collect data and prepare reports. The research firm can be provided with the IP addresses of all devices that are to be studied, and can then develop a program to collect and analyze the data from all the devices. The manufacturer can then use this information to develop new and better products, or to resolve issues in the field.

In one embodiment of the present invention, the engine is configured to provide only basic information to a user on a webpage, such as the name of the device, date activated, and usage. For example, in the case of a water treatment system, the webpage displayed to the user contains information relevant to volume of water treated, percentage of filter life remaining, and power consumption, among other data of interest to the user.

In another embodiment of the present invention, the engine can be reconfigured to provide different information based on the requester, and provide information tailored to that requester's needs. For example, the retailer of a device can tailor the accessed webpage to display information different from that of the user display. The model number, software version, performance data are illustrative of information that the manufacturer would be much more concerned with obtaining from the device, though the information displayed could optionally be modified to display additional (or less) information, under defined guidelines.

In another embodiment of the present invention, the engine is configured for a remote host, which has complete access to all information the device contains. Using the same water treatment system example as previously, the manufacturer is able to obtain all information the device contains, such as the date purchased, date of first use, date of last use, frequency of use, power consumption, and any and all data that the device is capable of generating.

In another embodiment of the present invention, the engine is configured to allow other parties to access the device's webpage for the purposes of analyzing and extracting information. For example, a company directed by the manufacturer could study the devices using the webpage information generated by each device of a given model device. The company could then analyze the data and provide the manufacturer the results, market data or data used in future research and development, among other reasons. By using the present invention in this manner, manufacturers can be constantly aware of all products in the marketplace, and use the information to design better devices, for example, that meet the needs of actual consumers.

DETAILED DESCRIPTION OF THE INVENTION

Figure 1:
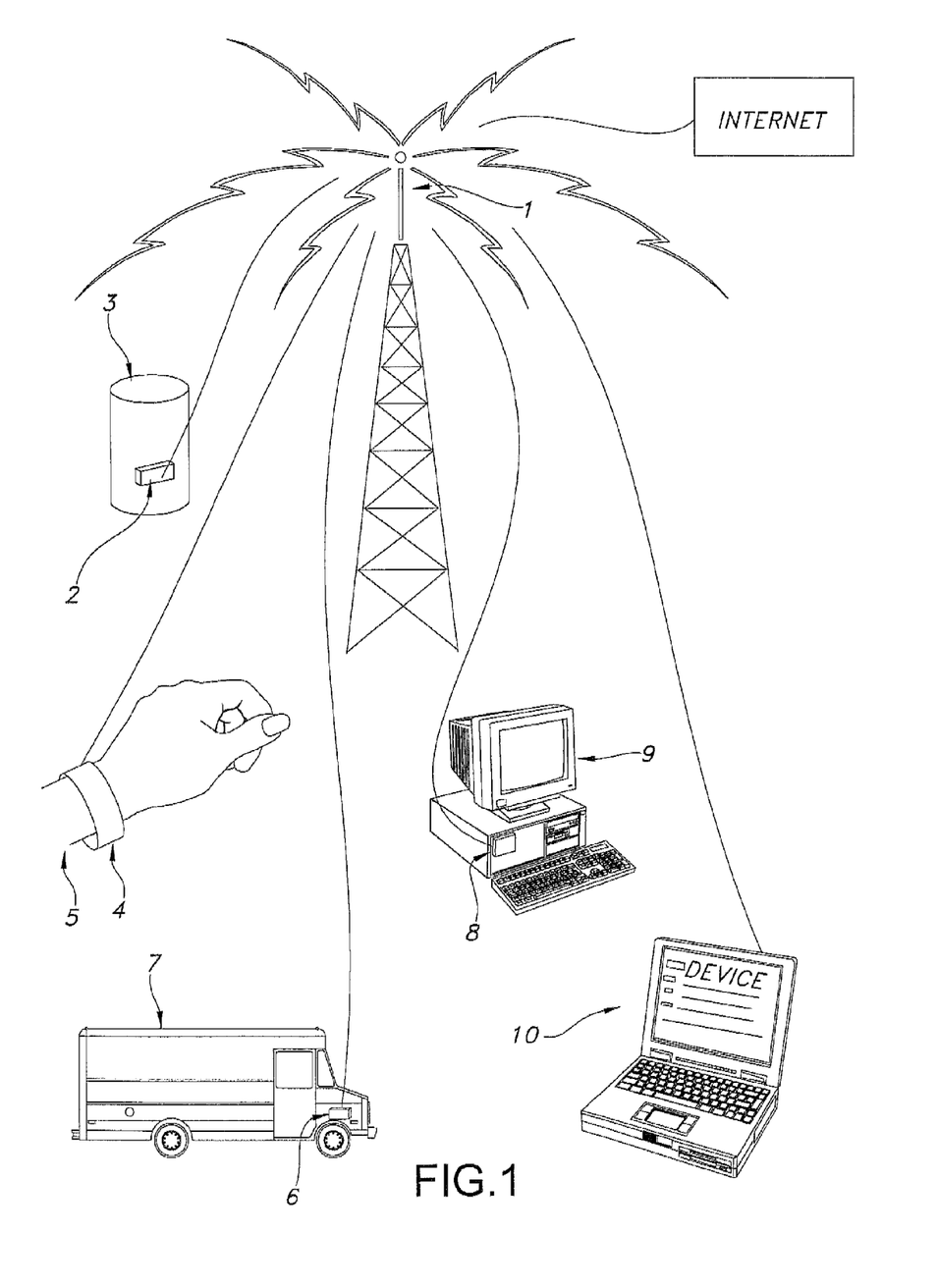
FIG. 1 is a schematic layout of various embodiments of the present invention.

Referring now to FIG. 1, the system and method of the present invention is shown, with several embodiments. A wireless Internet network 1 is shown, with Internet connections to a number of mini-servers 2.

In a first embodiment, device 3 is shown with a mini-server 2 contained within device 3 and is electronically connected to device 3. Alternatively, mini-server 2 could be attached to the exterior surface of device 3, or located some distance from device 3. In any arrangement, mini-server 2 has an electronic connection to device 3 is able to monitor and control device 3 if desired. Device 3 could, for example, be a household appliance, such as a water treatment system. When the water treatment system is activated (electrically powered up), the mini-server 2 makes a wireless connection to the Internet. Mini-server 2 contains the markup language of the present invention, which is detailed below. The markup language allows the device to be treated as an object on a webpage, through the mini-server's unique IP address. As a result, an Internet user enters the IP address of the water treatment system mini-server and is presented with a webpage that represents the water filter. The webpage displays varied information, depending upon the user. Such information includes the IP address and location of the water filter, the current status of the water filter, life remaining in the treatment system filter element, and so forth. The access to the water treatment system is secured through an encryption and password system, so that unwanted access to the water treatment system (or any other device equipped with a mini-server 2) is prevented. Additionally, the mini-server 2 is integral to the water treatment system or any other device so equipped in that along with monitoring its device, the mini-server can also control the device. Using the same water treatment system example, if the mini-server detects a situation that is beyond factory defined parameters, the mini-server is able to deactivate the water treatment system to prevent further use. An alert is then sent through the Internet to the manufacturer, in this example, so that the situation may be remedied. Since the mini-server is a powerful computer, it has the ability to store, process, and manipulate data that it receives or generates. In a related example, if the mini-server 2 detects that the water filter's element is nearly full, the mini-server can contact the manufacturer or other supplier to automatically send a new replacement element to its location, eliminating the need for the owner to obtain a new element and insuring a high level of performance before the water treatment system filter element requires replacement. Customer satisfaction with the water treatment system is greatly enhanced and product integrity is maintained.

In another embodiment of the present invention, mini-server 4 is issued to student 5 upon enrollment at a school or at a public place, such as an amusement park (not shown). The human-portable mini-server 4 contains all of the student's critical information (home address, contact numbers, blood type, allergies, medical conditions, etc.) The mini-server in this embodiment also includes a GPS device or other locating system, which provides the school administration the exact location of all students via a wireless Internet connection. The mini-server 4 may also include a security-access device that only allows students who have the mini-server on their person into a facility, such as through a turnstile gate system (not shown). In the event of an emergency, headcounts are easily made by simply accessing the Internet webpages of all students. Students not at school (home sick, on vacation) would be shown as not present since their mini-servers would be accessing the Internet from outside the school location, provided by their IP address. In this way, a school authority can determine the whereabouts of all of its students with a few keystrokes.

In the example of an amusement park or other public place, human-portable mini-servers can be assigned to all attending individuals in the form of a wristband or other accessory, or incorporated into an article of clothing. The mini-servers can then be used to monitor the location of individuals within the public place. This has many advantages. First, the operators of a public place can easily locate an individual in an emergency, such as at a concert, sporting event or amusement park. Second, the flow of individuals within an area can be measured and studied. This information can show where pedestrian bottlenecks are located, which areas are more popular, or the waiting times for rollercoaster rides, for example. By tracking how long individuals are waiting in lines, an accurate display can be provided to a message board at the entrance of the ride. Those individuals wishing to enter the line will have a good estimate of how long the wait time will be before they reach the front of the line.

When the individuals are ready to depart the public place, such as an amusement park, the mini-servers can be collected for reuse and reassignment. An incentive plan could offer some compensation to the individuals for wearing the mini-server, such as a souvenir, or the mini-server itself could be a souvenir, fashioned into an object that is collectable or desirable to individual patrons, such as a bracelet or key ring.

In another embodiment of the present invention shown in FIG. 1, mini-server 6 is located within vehicle 7. In this embodiment, mini-server 6 monitors and may optionally control vehicle 6's operations as well as its geographical location. In this application, mini-server 6 draws power from the vehicle 7's battery so the mini-server is able to monitor the vehicle even while it is stationary and inactive. The mini-server is able to monitor the vehicle's performance, such as current speed, average speed, fuel economy, driving attributes (measuring g-forces), etc. This information is wirelessly transmitted via the Internet to the webpage accessible by the vehicle's owner, for example. Using the example of a vehicle fleet owner, each vehicle has its own mini-server with a wireless Internet connection. The mini-server is integrated into the vehicle's on-board computer, which controls such functions as engine management, anti-lock brake operation, etc. At any time, the fleet owner or other approved party may view the vehicle's webpage by entering its IP address into a web browser. If the vehicle is parked in its proper location, the webpage will display that information, provided by the mini-server with geographical locating ability. Also displayed is the vehicle ID number, license plate number, the name of employee assigned to the vehicle, and other data, such as odometer mileage. When the vehicle's engine is started, the mini-server updates the changed information through the Internet and the webpage reflects the updated information. Thus it is possible to monitor the vehicle in real-time, on the vehicle's webpage, if desired. Parameters may be used to govern the vehicle, such as an overall vehicle speed limit, or an outer range from the vehicle's base. In the event that the operator of the vehicle violates a parameter, the mini-server is able to either dissuade the activity (use brakes/throttle to slow down vehicle) or simply logs the violation for future action by the fleet owner. Another advantage of this embodiment is the ability of the fleet owner to very accurately record and document vehicle mileage, such as between delivery stops, for billing and other purposes.

In another embodiment of the present invention, shown in FIG. 1, mini-server 8 is installed within home entertainment system (HES) 9. Mini-server 8 is electronically connected to the devices in the HES, such as the TV, VCR, DVD player, cable box, etc. The mini-server is also wirelessly connected to the Internet, enabling a parent, for example, to access the HES by entering its IP address into a web browser. Displayed in the webpage is a list of all devices in the HES, model numbers, power consumption, and current activity, for example. The parent is able to see, displayed on the webpage, what is being watched on the HES currently and what has been watched previously, including time and date. Also, the parent is able to lock out certain channels or certain shows, using the mini-server's connection to the cable box or other channel controller. If the parent desires to limit HES usage to a set period per day, the mini-server is able to receive that command through the webpage and execute it if the set number of hours is exceeded. An additional advantage of the present invention is that the location of the mini-server may be obtained for security reasons. If the HES is stolen, for example, the mini-server will report that its location has changed, and the new location will be shown on the HES' webpage. The mini-server may be programmed to send an alert and a request for deactivation if the HES has been stolen, rendering it inactive and useless.

Computer 10 with an Internet connection displays a webpage 11 using the markup language of the present invention. Mini-servers 2, 4, 6, and 8 as an example shown in FIG. 1 connect wirelessly to the Internet so as to be available for access by computer 10 when a user enters the mini-servers' IP addresses into a web browser. The webpage display allows easy comprehension and display of the devices (with mini-servers) being monitored and options available for each device. As explained above, data relevant to each device is recorded and monitored, software are sent to upgrade or maintain the mini-servers, and commands are sent to each mini-device as well.

Figure 2:
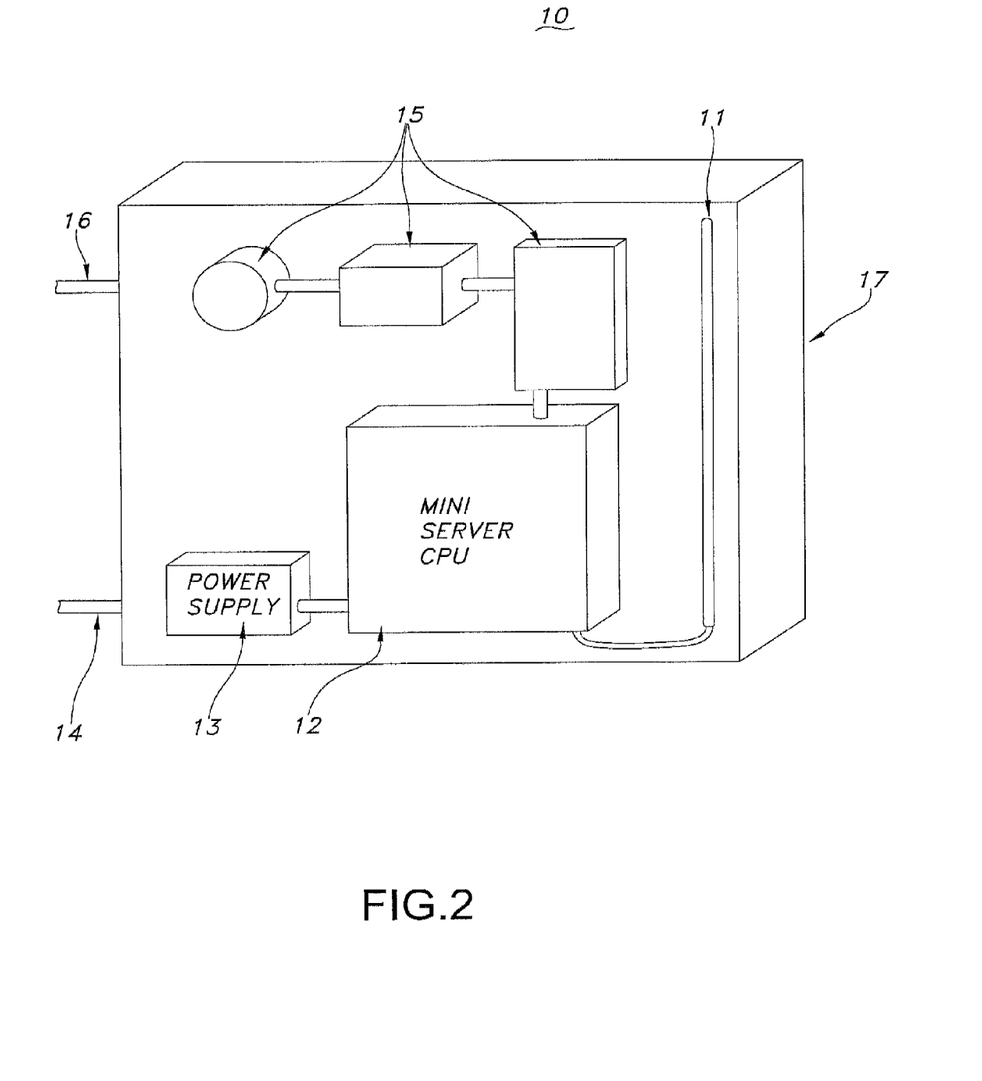
FIG. 2 is an illustration of a min-server according to at least one embodiment of the present invention.

Referring now to FIG. 2, mini-server 10 according to an embodiment of the present invention is shown. Antenna 11 enables the mini-server to detect and establish wireless Internet connections whereby data is communicated to users in the Internet. Connected to antenna 11 is mini-server central processing unit (CPU) 12, which analyzes data, receives communications, and arranges the data into the markup language of the present invention. Power supply 13 supplies power to CPU 12 which may be supplemented by power cord 14 in certain embodiments. Sensors 15 which monitor, obtain, and control a device are connected to CPU 12. In some embodiments, additional communication with a device is obtained through connection wire 16. Housing 17 encloses and protects mini-server 10. In some embodiments, housing 17 is deleted and antenna 11, CPU 12, and sensors 15 are integrated into a device.

CPU 12 is programmed with the markup language of the present invention which allows for a device to be treated as an object in a webpage. Instead of using HTML, which produces a generally unreadable script, the markup language of the present invention is used, which represents the device in clearly defined terms. Additionally, CPU 12 has the ability to analyze data, communicate data, and control its device if necessary through connection wire 16 or directly though a controller/computer of the device. For example, if mini-server 10 is connected to a vehicle, the power supply 4 of mini-server 10 is recharged by and draws power from the vehicle electrical system with power cord 14. Sensors 15 are not limited to the sensors of mini-server 10, but also the sensors and other electronics of the vehicle, such as the speedometer. The CPU 12 receives and processes data from multiple sources, and encodes all information to the markup language of the present invention.

The markup language of the present invention is directed toward a language that is intent-based. It is defined as a language that is not strictly connected only to the text of the script, but also the intent of the language. For example, the term "technical university", when translated into other languages, may not have the exact same meaning as it does in English. According to the markup language of the present invention, nested "tags" are created to indicate the object of the intent of the term. Thus "technical university" is defined according the language of the present invention as "<institution><university><technical>", so that a computer can easily locate and analyze terms in the language.

The markup language and system of the present invention consists of two parts—the mini-server in webspace and the web browsers that interact with the mini-server. The mini-server accepts requests for access, allowing data to be transmitted, and preventing unauthorized access as well. The markup language enables the device to be defined both statically and dynamically. The browser is an interpreter which takes the language script and displays the information on the webpage, depending on the predetermined level of clearance.

The markup language and mini-server allow users to access the device, whether the user is the actual owner of the product, the distributor, a market research firm, or the manufacturer. The predetermined level of information displayed is provided for each user, so that no private information is disclosed or no unnecessary information overwhelms a user. In effect, the mini-server filters the data, allowing only the pertinent information to reach the desired users.

An important aspect of the present invention is that the object-oriented language turns devices into web-based objects; in other words, devices are given identities on the Internet that users can access. That identity is a webpage and each device displays information about itself on its webpage. Not only can users interact with devices through the Internet, but devices can also interact with other devices independent of human-driven contact. For example, devices of the same make and model can access each other's webpage and determine which device has the newest software version installed. The device with the older version can then download the newer version from the other device, or contact the manufacturer for the upgrade. This is particularly useful in the event the device has been inactive for a long period, such as the time from manufacture to the first activation by the end user, or if the device is simply infrequently used. Devices can recognize other devices that are of the same type or manufacturer and become linked, in a form of an electronic family. A host or other user could then access this family of devices as a whole, rather than separately. For example, devices within a home could prioritize themselves and deactivate themselves to save energy.

Technical Documentation of the Markup Language:

The current group of Internet languages are non-standard and interfere with each other. HTML is a standard script for webpages, but HTML has no capability to run a content-driven web page. Even for a very simple webpage, the HTML version of the webpage tells very little about the content of the webpage. Aside from the meta-tags, whose sole purpose is to provide a small amount of content for the object-oriented web concept, there is other way to understand what the actual content of the webpage is unless you are a human user interpreting the final result of the webpage on a computer screen.

Under the new markup language of the present invention, a new object-oriented interface is created, resulting in a content-based script, which is practical and clear for any device to utilize. An example is shown below:

```
<institution>
    <university>
        <technical>
        <name>Acme Institute of Technology</name>
        <user page>
            <menu>
            <selection:1>What's new</selection>
                <selection properties=size...>News</selection>
                <selection properties=bold...>Business</selection>
            <selection:2>properties=font>Academics</selection>
```

Each tag listed, shown above in an example, represents something pertaining to the webpage and its contents. In contrast with current markup languages, which are inflexible and unintelligible to both humans and devices, the language of the present invention is content-based which enables a user to define a webpage by indiscriminate content, but also a computer that is programmed to conduct automated research can make sense of the webpage contents since all information is clearly labeled.

Another advantage of the language is the indiscriminate content, which eliminates language barriers. The content of the webpage moves through translation seamlessly, since the webpage states that it is intent for representation (i.e., <university>, <institution>). In other words, a generic term such as institution can be further represented, or described, in the tree structure as shown above, to provide more detail as required. For example, in Germany, there are various terms that describe educational institutions that overlap those used in American English. This tree structure of the language eliminates this potentially confusing situation.

EXAMPLE

For illustration, an example device (a water treatment system) will be used to demonstrate the present invention. This device is located in a wireless network at a remote location.

Each tag is object (or device) oriented. This language is highly portable and embeddable in various electronic devices, such as a water treatment system.

```
<class>
    <type>
        <definitions> </definitions>
        <characteristics> </characteristics>
    <user page>
    ...
```

An example of the language as applied to the water treatment system:

```
<device>
    <water treatment system>
        <inventor> Acme Incorporated </inventor>
        <encrypted serial number> 11135889736292436 </encrypted serial number>
        <manufacturer> Acme Incorporated
            <place> Anytown, USA </place>
            <factory> 12 </factory>
        </manufacturer>
        <name> widget </name>
        <model> Z 240I </model>
        <weight>
            <pounds> 22.0 </pounds>
            <kilograms> 10 </kilograms>
        </weight>
        <dimensions>
            <height> 5 cm </>
            <length> 8.657 cm </>
            <width> 40.0 cm </>
        </dimensions>
        <usage>
            <water volume>402.781 </water volume> </>
        <number of times used>667 </>
        <percentage used>30% </>
        <user page>
            ''enclosed is any script or page information for direct user access
        </user page>
    </water treatment system>
</device>
```

The <device> tag represents the class of the object/device in webspace. In other instances, <automated machine>, <webpage>, <script>, etc, are possible descriptors of the class of the object to be defined in webspace. Next is <type>, which in this example is "water treatment system". A computer program within the mini-server is designed to interpret this script and information. The browser contacts the IP address of the treatment system, and would receive the script listed above, sent from the device's mini-server. The browser is able to contact certain types of devices—in this example, water treatment systems. The engine can also limit its queries by inventor, Acme Incorporated only, for example.

If the browser looks as the following portion of the script below, it can obtain information

```
<weight>
    <pounds> 22.0 </pounds>
    <kilograms> 10 </kilograms>
</weight>
<dimensions>
    <height> 5 cm </>
    <length> 8.657 cm </>
    <width> 40.0 cm </>
</dimensions>
``` and easily determine that </manufacturer> denotes the end of the manufacturer information; <weight> signifies the beginning of the weight information; <pounds> 22.0 </pounds> is understood to denote a sub-characteristic of "weight, or a type of weight, which is units of pounds and has a numerical value of 22.0. For metric weight, <kilograms> is provided as well. Please note that both units of weight are on the same indent, or nesting level. This arrangement tells the engine that each value is a weight characteristic and can be used at the discretion of the interpreting engine. In the case of a computer with a browser, based in Europe, accessing a device in the USA, since results are desired in metric units, only the metric value will be accessed. Also included in the language of the present invention is a short-hand method of closing tags "</>".

The <user page> tag is a standard level tag which is nested inside the type tag (<type> or <water treatment system> in the example). This tag is included in the event the host or user desires to embed any additional script. The script need not be compatible with the object-oriented format, or it may be a script that is object-oriented in the markup language and could be used to program a user interface. For example, the <user page> tag could be a default webpage that opens if a web browser attempts to access the device IP address. This is useful to deter a user from altering the background tags, which have more importance to the host, manufacturer, or computer programs conducting research meant to access the particular information. Rather, the user is presented with an attractive user interface webpage, which provides all the information the user has need of.

The scripting technique of the present invention acts fluidly, flexibly changing between the embedded hardware and the outside user, whether end user, manufacturer, or other party, and the analyzing engine. Importantly, the encrypted dynamic serial number is securely extracted to a host or outside computer with no risk to the user's privacy. While the serial numbers are encrypted, the host or computer program can easily browse through many devices and quickly extract the desired information.

The processor of information in the present invention is the browser. The browser accesses many devices through their mini-servers by IP addresses, reads the script, such as shown above, and interprets it. The browser extracts the encrypted serial number, decrypts the numbers, and extracts any information regarding each device as programmed. The browser considers each device unique, according to its serial number, usually treated as the defining factor. However, other factors could be used to sort the information, such as IP address, location, usage rate, etc.

The present invention is very versatile. Tags can be altered and exchanged to follow different formats for different needs. See the examples below detailing the script's versatility.
Host Access: Acme Incorporated
Serial Number: 11135889736292436
*the serial number is hidden otherwise*
Manufacturer: Acme Incorporated
Factory: 12
Model: Z 2401
Percent used: 70%
Times used: 667
Query Prompt: "to give a command for asking anything about the device, which may be an option."
User Access: John Q. Public
Manufacturer: Acme Incorporated, Anytown, USA
Model: Z 2401
Weight: 22 pounds
Dimensions: 5.0×8.657×40.0 cm
User page information: . . .
Deutscher Benutzer: John Q. Public
Hersteller: Acme Incorporated, Anytown, USA
Modell: Z 2401
Gewicht: 10 Kg
Masse: 5.0×8.657×40.0 cm
Benutzerseite Informationen: . . .

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A system for communicating device information comprising:
    a first device having a unique serial number comprising a static portion and a dynamic portion, the static portion including identification information for the first device and the dynamic portion including status information for the first device, the first device including a first mini-server computer encoded with instructions that allow information relating to the first device to be made accessible via a computer network at a first Internet Protocol address.

2. The system of claim 1, wherein the dynamic portion of the serial number includes information indicating that a service part should be ordered.

3. The system of claim 2, wherein the service part is automatically ordered.

4. The system of claim 2, wherein the first device is a water treatment system and the service part is a filter for the water treatment system.

5. The system of claim 1, wherein the dynamic portion of the serial number includes information indicating that the first device requires maintenance.

6. The system of claim 1, wherein the first device includes one or more sensors configured to obtain status information for the first device.

7. The system of claim 1, wherein usage of the first device can be restricted via the computer network.

8. The system of claim 1, wherein the first device is a water treatment system and wherein the status of the first device is indicative of at least one of: a water treatment system location and/or an amount of life remaining on the water treatment system filter.

9. The system of claim 1, wherein the first device is a personal monitor and wherein the status of the first device is indicative of a condition of the person wearing the personal monitor.

10. The system of claim 1, wherein the first device is a vehicle and wherein the status of the first device is indicative of at least one of: vehicle location, vehicle speed, vehicle mileage and/or a warning condition.

11. The system of claim 1, wherein the first device is a home entertainment system and wherein the status of the first device is indicative of at least one of: present usage and/or previous usage.

12. The system of claim 1, wherein the first device is a global positioning system enabled bracelet and wherein the status of the first device is indicative of bracelet location.

13. The system of claim 1, wherein the instructions encoded on the first mini-server are written in a markup language that includes tags, each tag including a term that describes an aspect of the first device.

14. The system of claim 13, wherein the tags are nested such that tags that are more descriptive of the first device are further indented.

15. The system of claim 1, further including:
a second device including a second mini-server computer encoded with instructions that allow information relating to the second device to be made accessible via the computer network at a second Internet Protocol address, wherein the first device is configured to access information that relates to the second device via the computer network from the second IP address.

16. The system of claim 15, wherein the first device is configured to determine whether the second device has a more recent software version installed than the first device based on information relating to the second device that is accessed via the computer network from the second IP address.

17. The system of claim 16, wherein the first device is configured to request that the more recent software version be downloaded to the first device.

18. The system of claim 17, wherein the first device is configured to request that the more recent software version be downloaded from the second device.

19. The system of claim 15, wherein the first device is configured to link to the second device based on information relating to the second device that is accessed via the computer network from the second IP address.

20. The system of claim 19, wherein the first device is configured to link to the second device if the first device and the second device have the same model or the same manufacturer.

21. A method for communicating device information comprising:
using a first mini-server computer encoded with instructions to make information relating to a first device accessible via a computer network at a first Internet Protocol address, the first device having a unique serial number comprising a static portion and a dynamic portion, the static portion including identification information for the first device and the dynamic portion including status information for the first device.

22. The method of claim 21, further including indicating with the dynamic portion of the serial number that a service part should be ordered.

23. The method of claim 22, further including automatically ordering the service part.

24. The method of claim 22, wherein the first device is a water treatment system and the service part is a filter for the water treatment system.

25. The method of claim 21, further including indicating with the dynamic portion of the serial number that the first device requires maintenance.

26. The method of claim 21, further including obtaining status information for the first device using one or more sensors included with the first device.

27. The method of claim 21, further including restricting usage of the first device via the computer network.

28. The method of claim 21, wherein the first device is a water treatment system and wherein the status of the first device is indicative of at least one of: a water treatment system location and/or an amount of life remaining on the water treatment system filter.

29. The method of claim 21, wherein the first device is a personal monitor and wherein the status of the first device is indicative of a condition of the person wearing the personal monitor.

30. The method of claim 21, further including:
using a second mini-server computer encoded with instructions to make information relating to a second device accessible via a computer network at a second Internet Protocol address; and
using the first device to access the information that relates to the second device via the computer network from the second IP address.

* * * * *